United States Patent
Ando et al.

(10) Patent No.: US 7,610,954 B2
(45) Date of Patent: Nov. 3, 2009

(54) COOLING SYSTEM, CONTROL METHOD OF THE SAME, AND MOTOR VEHICLE

(75) Inventors: Ikuo Ando, Aichi-ken (JP); Osamu Harada, Toyota (JP); Yukio Kobayashi, Kasugai (JP); Katsuhiko Yamaguchi, Nissin (JP); Kazuhiro Ichimoto, Nissin (JP); Takahiro Nishigaki, Nagoya (JP); Daigo Ando, Nissin (JP); Mamoru Tomatsuri, Toyota (JP); Keiko Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 386 days.

(21) Appl. No.: 10/594,550

(22) PCT Filed: Apr. 5, 2005

(86) PCT No.: PCT/JP2005/006988

§ 371 (c)(1),
(2), (4) Date: Sep. 27, 2006

(87) PCT Pub. No.: WO2005/121521

PCT Pub. Date: Dec. 22, 2005

(65) Prior Publication Data

US 2007/0181356 A1   Aug. 9, 2007

(30) Foreign Application Priority Data

Apr. 7, 2004   (JP)   ............................. 2004-112629

(51) Int. Cl.
*B60H 1/00* (2006.01)
(52) U.S. Cl. ...................................... 165/202; 165/271
(58) Field of Classification Search .................. 165/98, 165/271, 202, 203, 204; 123/41.04, 41.05
See application file for complete search history.

(56) References Cited

U.S. PATENT DOCUMENTS

| | | | | |
|---|---|---|---|---|
| 4,779,577 | A | * | 10/1988 | Ritter et al. ............... 123/41.05 |
| 5,647,317 | A | * | 7/1997 | Weisman et al. ............ 123/299 |
| 6,450,275 | B1 | | 9/2002 | Gabriel et al. |

FOREIGN PATENT DOCUMENTS

| | | |
|---|---|---|
| JP | 04-365923 | 12/1992 |
| JP | 06-207513 | 7/1994 |
| JP | 09-170434 | 6/1997 |
| JP | 2002-223505 A | 8/2002 |
| JP | 2003-506616 A | 2/2003 |

* cited by examiner

*Primary Examiner*—Ljiljana (Lil) V Ciric
(74) *Attorney, Agent, or Firm*—Kenyon & Kenyon LLP

(57) ABSTRACT

The technique of the invention determines whether input data for driving and controlling a cooling fan have any abnormality (steps S100 and S110), sets an actual drive level F* of the cooling fan to a high level (Hi) in the event of detection of any abnormality (step S130), and controls a fan motor to drive the cooling fan at the set drive level F* (step S140). This arrangement effectively prevents a temperature rise to an abnormally high level in any of an engine and motors even in the event of any abnormality arising in the input data.

18 Claims, 2 Drawing Sheets

COOLING SYSTEM, CONTROL METHOD OF THE SAME, AND MOTOR VEHICLE

This is a 371 national phase application of PCT/JP2005/006988 filed 5 Apr. 2005, claiming priority to Japanese Patent Application No. 2004-112629 filed 7 Apr. 2004, the contents of which are incorporated herein by reference.

TECHNICAL FIELD

The present invention relates to a cooling system, a control method of the same, and a motor vehicle. More specifically the invention pertains to a cooling system that cools down multiple different heat generators, a control method of the cooling system, and a motor vehicle with multiple different heat generators mounted thereon.

BACKGROUND ART

One proposed cooling system includes a cooling circuit to cool an engine down, a radiator that cools down the cooling circuit with a supply of the outside air, a cooling fan that is connected with a fan drive motor via a clutch and feeds the supply of the outside air to the radiator, and a thermistor that detects temperature in the cooling circuit. In this proposed cooling system, the cooling fan is driven in response to a detection signal input from the thermistor (see, for example, Japanese Patent Laid-Open Gazette No. 6-207513). This prior art cooling system couples the cooling fan with the motor via the clutch in response to any abnormality, for example, a short circuit or an open circuit, arising in the thermistor to drive the cooling fan. This enhances the cooling efficiency of the cooling circuit and prevents a temperature rise of the engine to an abnormal level.

DISCLOSURE OF THE INVENTION

The prior art cooling system, however, can not control the drive level of the cooling fan in the event of the occurrence of any abnormality in the thermistor. The cooling fan driven in response to the occurrence of an abnormality in the thermistor may thus give only an insufficient supply of the outside air to the radiator. The insufficient feed of the outside air may lead to a failure in sufficiently cooling down the engine and cause a temperature rise of the engine to an abnormally high level. The prior art technique is not applicable to deal with the occurrence of an abnormality in control signals in a controller for controlling a control fan in a cooling system that cools down multiple different heat generators, such as an engine and a motor. The occurrence of an abnormality in the control signals may lead to inadequate control of the cooling fan and cause a temperature rise to an abnormally high level in some of the heat generators. It is desirable to drive and control the cooling fan at an adequate cooling efficiency in the cooling system that cools down the multiple different heat generators. The prior art cooling system, however, does not take into account the cooling efficiency for the control.

The cooling system, the control method of the cooling system, and the motor vehicle of the invention thus aim to prevent a temperature rise to an abnormally high level in any of multiple heat generators even in the event of any abnormality arising in control signals, which are input to control an outside air supply regulation module that regulates a supply of the outside air used to cool down at least one heat exchange medium to cool down the multiple heat generators. The cooling system of the invention that cools down multiple different heat generators, as well as the control method of the cooling system and the motor vehicle of the invention also aim to drive and control a cooling fan at an adequate level of cooling efficiency.

The cooling system, the control method of the cooling system, and the motor vehicle of the invention have constructions discussed below, in order to attain at least part of the above and the other related objects.

A cooling system of the invention is a cooling system that cools down multiple different heat generators, and the cooling system includes: multiple cooling circuits that adopt one identical heat exchange medium or multiple different heat exchange media to cool down the multiple different heat generators; a heat exchange module that uses outside air to cool down the identical heat exchange medium or the multiple different heat exchange media of the multiple cooling circuits; an outside air supply regulation module that regulates a supply of the outside air used by said heat exchange module to cool down the identical heat exchange medium or the multiple different heat exchange media; and a control module that drives and controls the outside air supply regulation module in response to control signals input from the multiple cooling circuits in a normal state, while driving and controlling the outside air supply regulation module to increase the supply of the outside air in an abnormal state where any abnormality arises in the control signals input from the multiple cooling circuits.

The cooling system of the invention drives and controls the outside air supply regulation module in response to control signals input from the multiple cooling circuits in the normal state, while driving and controlling the outside air supply regulation module to increase the supply of the outside air in an abnormal state where any abnormality arises in the control signals input from the multiple cooling circuits. This arrangement enhances the cooling efficiencies in the abnormal state and thus effectively prevents a temperature rise to an abnormally high level in any of the multiple different heat generators. The multiple different heat generators may include at least one of an internal combustion engine, a motor, a generator, and an inverter. Typical examples of the heat exchange medium include cooling water and the air. In an air conditioning system that cools down the inside of a room, the inside of the room to be cooled down is one heat generator and a coolant used is the heat exchange medium.

In the cooling system of the invention, it is preferable that the control module drives and controls the outside air supply regulation module to supply the outside air at a maximum supply capacity of the outside air supply regulation module in the abnormal state. This arrangement heightens the cooling efficiency to the maximum capacity of the outside air supply regulation module and thereby more effectively prevents a temperature rise to an abnormally high level in any of the multiple different heat generators.

In one preferable embodiment of the invention, the cooling system may further include: temperature measurement units that respectively measure temperatures of the identical heat exchange medium or the multiple different heat exchange media used in the multiple cooling circuits, and the control signals input from the multiple cooling circuits may be based on the temperatures measured by the temperature measurement units. Moreover, the cooling system may include: working state detection units that respectively detect working states of the multiple different heat generators, wherein the control signals input from the multiple cooling circuits may be based on the working states detected by the working state detection units.

Further, in the cooling system of the invention, the outside air supply regulation module may include a cooling fan, the identical heat exchange medium or the multiple different heat exchange media may include at least one of water and a coolant, and the heat exchange module may includes a radiator.

A motor vehicle of the invention is a motor vehicle with multiple different heat generators mounted thereon, and the motor vehicle includes: multiple cooling circuits that adopt one identical heat exchange medium or multiple different heat exchange media to cool down the multiple different heat generators; a heat exchange module that uses outside air to cool down the identical heat exchange medium or the multiple different heat exchange media of the multiple cooling circuits; an outside air supply regulation module that regulates a supply of the outside air used by the heat exchange module to cool down the identical heat exchange medium or the multiple different heat exchange media; and a control module that drives and controls the outside air supply regulation module in response to control signals input from the multiple cooling circuits in a normal state, while driving and controlling the outside air supply regulation module to increase the supply of the outside air in an abnormal state where any abnormality arises in the control signals input from the multiple cooling circuits.

The motor vehicle of the invention drives and controls the outside air supply regulation module in response to control signals input from the multiple cooling circuits in the normal state, while driving and controlling the outside air supply regulation module to increase the supply of the outside air in an abnormal state where any abnormality arises in the control signals input from the multiple cooling circuits. This arrangement enhances the cooling efficiencies in the abnormal state and thus effectively prevents a temperature rise to an abnormally high level in any of the multiple different heat generators. The multiple different heat generators may include at least one of an internal combustion engine, a motor, a generator, and an inverter. Typical examples of the heat exchange medium include cooling water and the air. In an air conditioning system that cools down the inside of a passenger compartment, the inside of the passenger compartment to be cooled down is one heat generator and a coolant used is the heat exchange medium.

In the motor vehicle of the invention, it is preferable that the control module drives and controls the outside air supply regulation module to supply the outside air at a maximum supply capacity of the outside air supply regulation module in the abnormal state. This arrangement heightens the cooling efficiency to the maximum capacity of the outside air supply regulation module and thereby more effectively prevents a temperature rise to an abnormally high level in any of the multiple different heat generators.

In one preferable embodiment of the invention, the motor vehicle may further include: temperature measurement units that respectively measure temperatures of the identical heat exchange medium or the multiple different heat exchange media used in the multiple cooling circuits, and the control signals input from the multiple cooling circuits may be based on the temperatures measured by the temperature measurement units. Moreover, the motor vehicle may include: working state detection units that respectively detect working states of the multiple different heat generators, wherein the control signals input from the multiple cooling circuits may be based on the working states detected by the working state detection units.

Further, in the motor vehicle of the invention, the outside air supply regulation module may include a cooling fan, the identical heat exchange medium or the multiple different heat exchange media may include at least one of water and a coolant, and the heat exchange module may includes a radiator.

A control method of a cooling system of the invention is a control method of a cooling system that cools down multiple different heat generators, and the cooling system includes: multiple cooling circuits that adopt one identical heat exchange medium or multiple different heat exchange media to cool down the multiple different heat generators; a heat exchange module that uses outside air to cool down the identical heat exchange medium or the multiple different heat exchange media of the multiple cooling circuits; and an outside air supply regulation module that regulates a supply of the outside air used by the heat exchange module to cool down the identical heat exchange medium or the multiple different heat exchange media, and the control method comprising the step of: driving and controlling the outside air supply regulation module in response to control signals input from the multiple cooling circuits in a normal state, while driving and controlling the outside air supply regulation module to increase the supply of the outside air in an abnormal state where any abnormality arises in the control signals input from the multiple cooling circuits.

The control method of the cooling system of the invention drives and controls the outside air supply regulation module in response to control signals input from the multiple cooling circuits in the normal state, while driving and controlling the outside air supply regulation module to increase the supply of the outside air in an abnormal state where any abnormality arises in the control signals input from the multiple cooling circuits. This arrangement enhances the cooling efficiencies in the abnormal state and thus effectively prevents a temperature rise to an abnormally high level in any of the multiple different heat generators.

The control method of the cooling system of the invention may drive and control the outside air supply regulation module to supply the outside air at a maximum supply capacity of the outside air supply regulation module in the abnormal state. This arrangement heightens the cooling efficiency to the maximum capacity of the outside air supply regulation module and thereby more effectively prevents a temperature rise to an abnormally high level in any of the multiple different heat generators.

BEST MODES OF CARRYING OUT THE INVENTION

Figure 1:
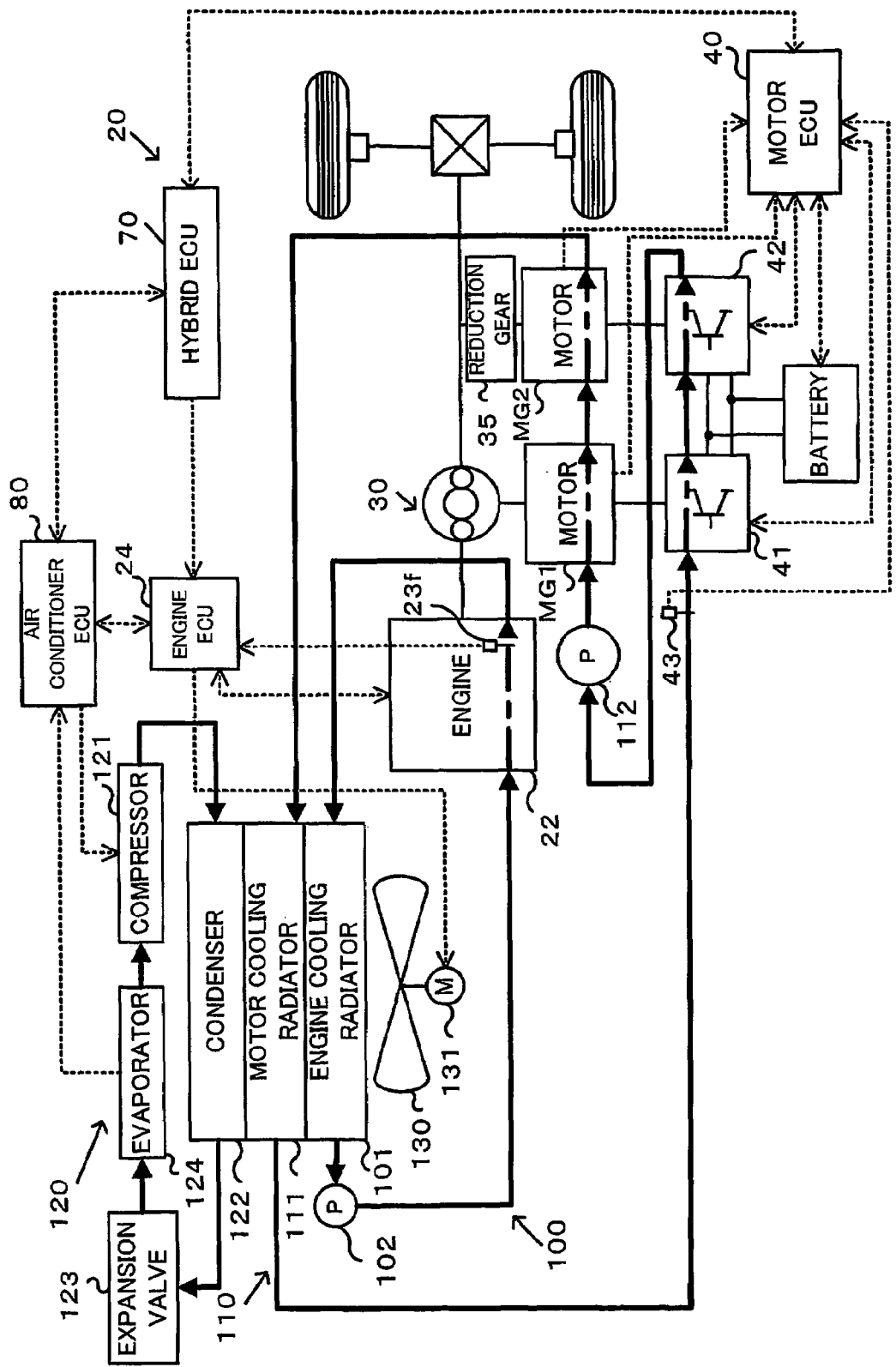
FIG. 1 schematically illustrates the configuration of a hybrid vehicle 20 in one embodiment of the invention.

One mode of carrying out the invention is described below as a preferred embodiment. FIG. 1 schematically illustrates the configuration of a hybrid vehicle 20 equipped with a cooling system in one embodiment of the invention. The hybrid vehicle 20 of the embodiment includes an engine cooling circuit 100 that cools an engine 22 down with a circulated flow of cooling water, a motor cooling circuit 110 that cools motors MG1 and MG2 down with a circulated flow of cooling water, an air conditioning system 120 that conditions the air in a passenger compartment of the hybrid vehicle with a circulated flow of a coolant, a cooling fan 130 that cools down the circulated flow of cooling water through the engine cooling circuit 100, the circulated flow of cooling water through the motor cooling circuit 110, and the circulated flow of the coolant through the air conditioning system 120, and an engine electronic control unit (hereafter referred to as engine ECU) 24 that controls the engine 22 and the cooling fan 130. The hybrid vehicle 20 of the embodiment further includes a planetary gear mechanism 30 including a carrier linked to a crankshaft of the engine 22, the motor MG1 that is linked to a sun gear of the planetary gear mechanism 30 and is capable of generating electric power, a reduction gear 35 that is attached to a ring gear shaft or a drive shaft linked to a ring gear of the planetary gear mechanism 30, and the motor MG2 that is connected with the reduction gear 35.

The engine cooling circuit 100 is structured as a circulation flow passage including a flow path of cooling water to cool the engine 22 down, and has an engine cooling radiator 101 to cool down the flow of cooling water with the outside air and a cooling water pump 102 to circulate the flow of cooling water. The flow of cooling water that is cooled down by the engine cooling radiator 101 is circulated through the circulation flow passage to cool the engine 22 down. A cooling water temperature sensor 23f is located downstream the flow path of cooling water for the engine 22. The measured cooling water temperature is input from the cooling water temperature sensor 23f into the engine electronic control unit (engine ECU) 24. The engine ECU 24 sets a drive demand Fe of the cooling fan 130 to a selected level among a high level (Hi), a medium level (M), a low level (Lo), and a full stop (S) according to the measured cooling water temperature input from the cooling water temperature sensor 23f, while driving and controlling the cooling fan 130. The engine ECU 24 also receives signals from various sensors required for the operations of the engine 22 and controls the operations of the engine 22 (including fuel injection control and ignition control). The engine ECU 24 establishes communication with a hybrid electronic control unit (hereafter referred to as hybrid ECU) 70 to receive required data for actuation of the cooling fan 130 and the operations of the engine 22 from the hybrid ECU 70 and send data relating to the driving conditions of the engine 22 to the hybrid ECU 70.

The motor cooling circuit 110 is structured as a circulation flow passage including a flow path of cooling water to cool down an inverter 41 for driving the motor MG1, an inverter 42 for driving the motor MG2, the motor MG1, and the motor MG2 and has a motor cooling radiator 111 to cool down the flow of cooling water with the outside air and a cooling water pump 112 to circulate the flow of cooling water. The flow of cooling water that is cooled down by the motor cooling radiator 111 is circulated through the circulation flow passage to cool down the inverters 41 and 42 and the motors MG1 and MG2. A cooling water temperature sensor 43 is located upstream the flow path of cooling water for the inverter 41. The measured cooling water temperature is input from the cooling water temperature sensor 43 into a motor electronic control unit (hereafter referred to as the motor ECU) 40. The motor ECU 40 sets a drive demand Fm of the cooling fan 130 to a selected level among a high level (Hi), a medium level (M), a low level (Lo), and a full stop (S) according to the measured cooling water temperature input from the cooling water temperature sensor 43. The motor ECU 40 establishes communication with the hybrid ECU 70 to send the setting of the drive demand Fm to the hybrid ECU 70. The motor ECU 40 also drives and controls the motors MG1 and MG2 and manages the state of a battery. The motor ECU 40 sends data relating to the driving conditions of the motors MG1 and MG2 and data representing the state of charge in the battery to the hybrid ECU 70 according to the requirements.

The air conditioning system 120 is structured as a circulation flow passage of the coolant and has a compressor 121 to compress the coolant to a high-temperature, high-pressure gas, a condenser 122 to cool down the compressed coolant with the outside air to a high-temperature, high-pressure liquid, an expansion valve 123 to abruptly expand the cooled coolant to low-temperature, low-pressure mist, and an evaporator 124 to evaporate the coolant to a low-temperature, low-pressure gas through heat exchange of the low-temperature, low-pressure coolant mist with the air in the passenger compartment. The air conditioning system 120 is under management of an air conditioning system electronic control unit (hereafter referred to as the air conditioner ECU) 80. The air conditioner ECU 80 drives and controls the compressor 121 according to a coolant temperature measured by a coolant temperature sensor (not shown) attached to the evaporator 124. The air conditioner ECU 80 sets a drive demand Fa of the cooling fan 130 to a selected level among a high level (Hi), a medium level (M), a low level (Lo), and a full stop (S) according to the measured temperature of the coolant input from the coolant temperature sensor attached to the evaporator 124. The air conditioner ECU 80 establishes communication with the engine ECU 24 and with the hybrid ECU 70 to send the setting of the drive demand Fa to the engine ECU 24 and to send data relating to the operations of the air conditioning system 120 to the hybrid ECU 70.

The cooling fan 130 is an electric fan driven by the power of a fan motor 131. The cooling fan 130 works to regulate the flow rate of the outside air for cooling down the flow of cooling water in the engine cooling radiator 101, as well as to regulate the flow rate of the outside air for cooling down the flow of cooling water in the motor cooling radiator 111 and the flow of the coolant in the condenser 122.

In the cooling system of the hybrid vehicle 20 of the embodiment constructed as discussed above, an actual drive level F* of the cooling fan 130 is determined in response to the drive demand Fe of the cooling fan 130 based on the measured cooling water temperature Tw from the cooling water temperature sensor 23f, in response to the drive demand Fm of the cooling fan 130 sent from the motor ECU 40 via the hybrid ECU 70, and in response to the drive demand Fa of the cooling fan 130 sent from the air conditioner ECU 80. The cooling fan 130 is driven and controlled to attain the determined drive level F*. The flow rates of the outside air fed from the cooling fan 130 to the engine cooling radiator 101, the motor cooling radiator 111, and the condenser 122 are regulated to cool down the circulated flow of cooling water through the engine cooling circuit 100, the circulated flow of cooling water through the motor cooling circuit 110, and the circulated flow of the coolant through the air conditioning system 120. The engine 22, the inverters 41 and 42, the motors MG1 and the MG2, and the passenger compartment are cooled down with the cooled flows of cooling water and the cooled flow of the coolant.

Figure 2:
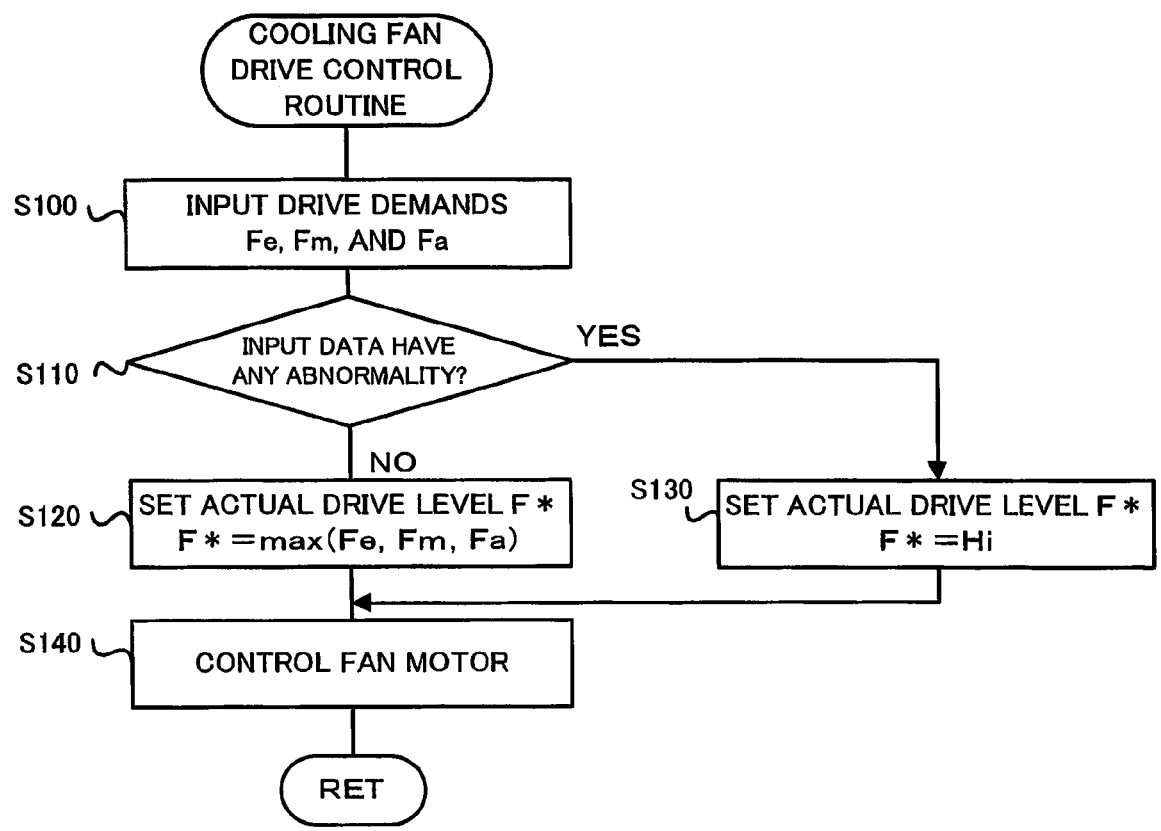
FIG. 2 is a flowchart showing a cooling fan drive control routine executed by an engine ECU 24 in the embodiment.

The description regards the operations of the cooling system of the hybrid vehicle 20 of the embodiment having the above construction. FIG. 2 is a flowchart showing a cooling fan drive control routine executed by the engine ECU 24. This drive control routine is repeatedly executed at preset time intervals (for example, at every 8 msec).

In the cooling fan drive control routine, the engine ECU 24 first inputs the drive demand Fe of the cooling fan 130 based on the measured cooling water temperature from the cooling water temperature sensor 23f, the drive demand Fm of the cooling fan 130 sent from the motor ECU 40, and the drive demand Fa of the cooling fan 130 sent from the air conditioner ECU 80, as well as other required data for control (step S100). The engine ECU 24 then determines whether the data input at step S100 have any abnormality (step S110). The technique adopted here for abnormality detection adds an abnormality detection bit, which is inverted in response to the occurrence of any abnormality, to each data input at step S100. Inversion or non-inversion of the abnormality detection bit determines the occurrence or non-occurrence of any abnormality.

No detection of any abnormality in the input data at step S110 proves that the data input at step S100 are all normal and that the standard operations will not lead to a temperature rise to an abnormally high level in any of the engine 22, the motors MG1 and MG2, the inverters 41 and 42, and the passenger compartment. The engine ECU 24 accordingly sets the maximum among the drive demands Fe, Fm, and Fa of the cooling fan 130 to the actual drive level F* of the cooling fan (step S130). In one example, when the drive demands Fe, Fm, and Fa are respectively set at the high level (Hi), the medium level (M), and the medium level (M), the high level (Hi) is set to the actual drive level F*. In another example, when the drive demands Fe, Fm, and Fa are respectively set at the low level (Lo), the medium level (M), and the medium level (M), the medium level (M) is set to the actual drive level F*. After setting the actual drive level F*, the fan motor 131 is controlled to drive the cooling fan 130 at the determined drive level F* (step S140). The cooling fan drive control routine is then terminated. In the normal state, the actual drive level F* of the cooling fan 130 is determined, in response to the drive demand Fe based on the cooling water temperature in the engine cooling circuit 100, the drive demand Fm based on the cooling water temperature in the motor cooling circuit 110, and the drive demand Fa based on the coolant temperature in the air conditioning system 120. Such regulation enables the circulated flow of cooling water through the engine cooling circuit 100, the circulated flow of cooling water through the motor cooling circuit 110, and the circulated flow of the coolant through the air conditioning system 120 to be adequately cooled down. The determination of the actual drive level F* of the cooling fan 130 according to the drive demands Fe, Fm, and Fa effectively prevents the fan motor 130 from uneconomically consuming the electric power to drive the cooling fan 130.

In the event of detection of any abnormality in the input data at step S110, on the other hand, determination of the actual drive level F* of the cooling fan 130 based on the data input at step S100 may cause a temperature rise to an abnormally high level in some of the engine 22, the motors MG1 and MG2, the inverters 41 and 42, and the passenger compartment. The actual drive level F* of the cooling fan 130 is accordingly set to the high level (Hi) to ensure the feed of the outside air at a maximum supply capacity of the cooling fan 130 (step S130). The drive control routine controls the fan motor 131 to drive the cooling fan 130 at the determined drive level F* (step S140) and is then terminated. In the case of detection of any abnormality in the data input at step S100, the actual drive level F* of the cooling fan 130 is set to the maximum level or the high level (Hi) to maximize the cooling efficiencies of the circulated flow of cooling water through the engine cooling circuit 100, the circulated flow of cooling water through the motor cooling circuit 110, and the circulated flow of the coolant through the air conditioning system 120. This arrangement effectively prevents a temperature rise to an abnormally high level in any of the engine 22, the motors MG1 and MG2, the inverters 41 and 42, and the passenger compartment air-conditioned by the air conditioning system 120.

As described above, the cooling system of the hybrid vehicle 20 of the embodiment drives and controls the cooling fan 130 to feed the outside air at its maximum supply capacity to the engine cooling radiator 101, the motor cooling radiator 111, and the condenser 122, in the event of detection of any abnormality in the input data for controlling the cooling fan 130. This arrangement effectively prevents a temperature rise to an abnormally high level in any of the engine 22, the motors MG1 and MG2, the inverters 41 and 42, and the passenger compartment air-conditioned by the air conditioning system 120. In the case of no detection of any abnormality in the input data for controlling the cooling fan 130, on the other hand, the cooling fan 130 is driven corresponding to the input data.

The cooling system of the hybrid vehicle 20 of the embodiment drives and controls the cooling fan 130 to feed the outside air at its maximum supply capacity, in the event of detection of any abnormality in the input data for controlling the cooling fan 130. The cooling fan 130 may be driven and controlled to feed the outside air at a capacity lower than its maximum supply capacity, as long as the cooling fan 130 gives a sufficient supply of the outside air.

In the cooling system of the hybrid vehicle 20 of the embodiment, the drive demands Fe, Fm, and Fa are set respectively based on the measured temperature of cooling water circulated through the engine cooling circuit 100, the measured temperature of cooling water circulated through the motor cooling circuit 110, and the measured temperature of the coolant circulated through the air conditioning system 120. The drive demands Fe, Fm, and Fa may be set according to any cooling conditions of the engine 22, the motors MG1 and MG2, and the passenger compartment, for example, the driving conditions of the engine 22, the motor MG1, and the air conditioning system 120.

In the cooling system of the hybrid vehicle 20 of the embodiment, the circulation flow passage of cooling water through the engine 22 is separated from the circulation flow passage of cooling water through the motors MG1 and MG2 and the inverters 41 and 42. In one modified structure, only one circulation flow passage of cooling water may be provided to cool down all the inverters 41 and 42, the motors MG1 and MG2, and the engine 22.

The cooling system of the hybrid vehicle 20 of the embodiment cools down the engine 22, the motors MG1 and MG2, the inverters 41 and 42, and the passenger compartment. The cooling system may be designed to cool down any other heat generators mounted on the hybrid vehicle 20.

The above embodiment regards the cooling system mounted on the hybrid vehicle 20. The technique of the invention is applicable to any cooling system to cool down multiple heat generators. For example, the cooling system according to the invention may be adopted in hybrid vehicles of various configurations, electric vehicles that are driven by the power of a drive motor actuated with a supply of electric power from fuel cells, as well as diversity of transportation equipment including trains and aircraft and power generation systems installed in houses and factories.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

INDUSTRIAL APPLICABILITY

The principle of the invention is applicable to manufacturing industries of cooling systems and motor vehicles.

The invention claimed is:

1. A cooling system that cools down multiple different heat generators, said cooling system comprising:
    multiple cooling circuits that adopt one identical heat exchange medium or multiple different heat exchange media to cool down the multiple different heat generators;
    a heat exchange module that uses outside air to cool down the identical heat exchange medium or the multiple different heat exchange media of said multiple cooling circuits;
    an outside air supply regulation module that regulates a supply of the outside air used by said heat exchange module to cool down the identical heat exchange medium or the multiple different heat exchange media; and
    a control module that drives and controls said outside air supply regulation module in response to control signals input from communication related to cooling down the multiple heat generators in a normal state with no abnormality in communication related to cooling down the multiple heat generators, while driving and controlling said outside air supply regulation module to increase the supply of the outside air in an abnormal state with an abnormality in communication related to cooling down the multiple heat generators,
    wherein, when there is no abnormality, the control module includes cooling level logic, the cooling level logic receives a plurality of cooling need levels from said control signals, and wherein the cooling level logic controls said outside air supply regulation module based on a maximum cooling need level of the plurality of cooling need levels.

2. A cooling system in accordance with claim 1, wherein said control module drives and controls said outside air supply regulation module to supply the outside air at a maximum supply capacity of said outside air supply regulation module in the abnormal state.

3. A cooling system in accordance with claim 1, said cooling system further comprising:
    temperature measurement units that respectively measure temperatures of the identical heat exchange medium or the multiple different heat exchange media used in said multiple cooling circuits,
    wherein the control signals input from said multiple cooling circuits are based on the temperatures measured by said temperature measurement units.

4. A cooling system in accordance with claim 1, said cooling system further comprising:
    working state detection units that respectively detect working states of said multiple different heat generators,
    wherein the control signals input from said multiple cooling circuits are based on the working states detected by said working state detection units.

5. A cooling system in accordance with claim 1, wherein said outside air supply regulation module comprises a cooling fan.

6. A cooling system in accordance with claim 1, wherein the identical heat exchange medium or the multiple different heat exchange media include at least one of water and a coolant.

7. A cooling system in accordance with claim 1, wherein said heat exchange module comprises a radiator.

8. A cooling system in accordance with claim 1, wherein said multiple different heat generators include at least one of an internal combustion engine, a motor, a generator, and an inverter.

9. A cooling system in accordance with claim 1, said cooling system further comprising:
    a heat generator control unit that controls at least one of the multiple different heat generators,
    wherein said control module detects the abnormal state in the event of failed data transmission to and from said heat generator control unit or in the event of failed communication with said heat generator control unit.

10. A motor vehicle with multiple different heat generators mounted thereon, said motor vehicle comprising:
    multiple cooling circuits that adopt one identical heat exchange medium or multiple different heat exchange media to cool down the multiple different heat generators;
    a heat exchange module that uses outside air to cool down the identical heat exchange medium or the multiple different heat exchange media of said multiple cooling circuits;
    an outside air supply regulation module that regulates a supply of the outside air used by said heat exchange module to cool down the identical heat exchange medium or the multiple different heat exchange media; and
    a control module that drives and controls said outside air supply regulation module in response to control signals input from communication related to cooling down the multiple heat generators in a normal state with no abnormality in communication related to cooling down the multiple heat generators, while driving and controlling said outside air supply regulation module to increase the supply of the outside air in an abnormal state with an abnormality in communication related to cooling down the multiple heat generators,
    wherein, when there is no abnormality, the control module includes cooling level logic, the cooling level logic receives a plurality of cooling need levels from said control signals, and wherein the cooling level logic controls said outside air supply regulation module based on a maximum cooling need level of the plurality of cooling need levels.

11. A motor vehicle in accordance with claim 10, wherein said control module drives and controls said outside air supply regulation module to supply the outside air at a maximum supply capacity of said outside air supply regulation module in the abnormal state.

12. A motor vehicle in accordance with claim 10, said motor vehicle further comprising:
    temperature measurement units that respectively measure temperatures of the identical heat exchange medium or the multiple different heat exchange media used in said multiple cooling circuits,
    wherein the control signals input from said multiple cooling circuits are based on the temperatures measured by said temperature measurement units.

13. A motor vehicle in accordance with claim 10, said motor vehicle further comprising:

working state detection units that respectively detect working states of said multiple different heat generators,
wherein the control signals input from said multiple cooling circuits are based on the working states detected by said working state detection units.

14. A motor vehicle in accordance with claim 10, wherein said outside air supply regulation module comprises a cooling fan,
the identical heat exchange medium or the multiple different heat exchange media include at least one of water and a coolant, and
said heat exchange module comprises a radiator.

15. A motor vehicle in accordance with claim 10, wherein said multiple different heat generators include at least one of an internal combustion engine, a motor, a generator, and an inverter.

16. A motor vehicle in accordance with claim 10, said motor vehicle further comprising:
a heat generator control unit that controls at least one of the multiple different heat generators,
wherein said control module detects the abnormal state in the event of failed data transmission to and from said heat generator control unit or in the event of failed communication with said heat generator control unit.

17. A control method of a cooling system that cools down multiple different heat generators, said cooling system comprising: multiple cooling circuits that adopt one identical heat exchange medium or multiple different heat exchange media to cool down the multiple different heat generators; a heat exchange module that uses outside air to cool down the identical heat exchange medium or the multiple different heat exchange media of said multiple cooling circuits; and an outside air supply regulation module that regulates a supply of the outside air used by said heat exchange module to cool down the identical heat exchange medium or the multiple different heat exchange media, said control method comprising the steps of:
driving and controlling said outside air supply regulation module in response to control signals input from communication related to cooling down the multiple heat generators in a normal state with no abnormality in communication related to cooling down the multiple heat generators, while driving and controlling said outside air supply regulation module to increase the supply of the outside air in an abnormal state with an abnormality in communication related to cooling down the multiple heat generators,
wherein, when there is no abnormality, the control module includes cooling level logic, the cooling level logic receives a plurality of cooling need levels from said control signals, and wherein the cooling level logic controls said outside air supply regulation module based on a maximum cooling need level of the plurality of cooling need levels.

18. A control method of a cooling system in accordance with claim 17, said control method comprising the step of:
driving and controlling said outside air supply regulation module to supply the outside air at a maximum supply capacity of said outside air supply regulation module in the abnormal state.

\* \* \* \* \*

UNITED STATES PATENT AND TRADEMARK OFFICE
CERTIFICATE OF CORRECTION

| | | |
|---|---|---|
| PATENT NO. | : 7,610,954 B2 | Page 1 of 1 |
| APPLICATION NO. | : 10/594550 | |
| DATED | : November 3, 2009 | |
| INVENTOR(S) | : Ando et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this

Fourteenth Day of December, 2010

David J. Kappos
*Director of the United States Patent and Trademark Office*